May 6, 1924.

W. D. WERTS

VEHICLE TRAILER STEERING DEVICE

Filed Sept. 15, 1921   2 Sheets-Sheet 1

1,493,009

INVENTOR.
William D. Werts
BY Herman Miller
ATTORNEY.

May 6, 1924.
W. D. WERTS
VEHICLE TRAILER STEERING DEVICE
Filed Sept. 15, 1921    2 Sheets-Sheet 2
1,493,009
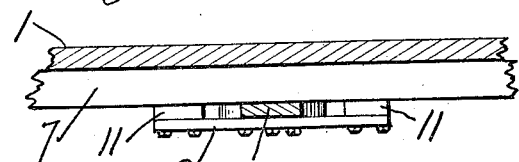
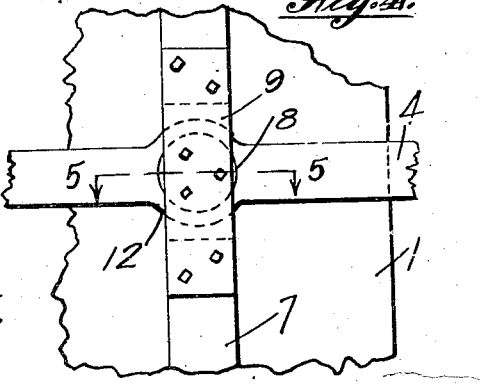
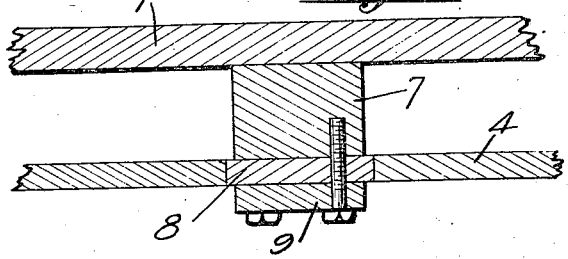
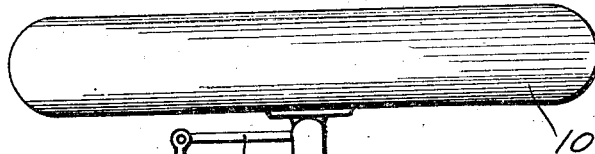
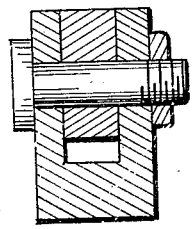
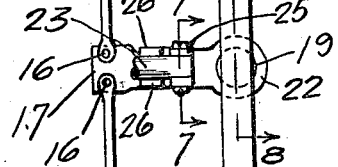
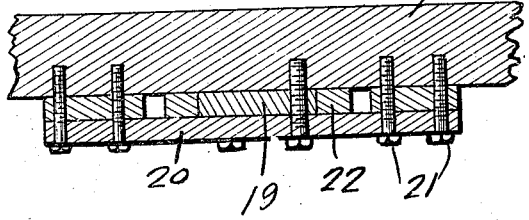
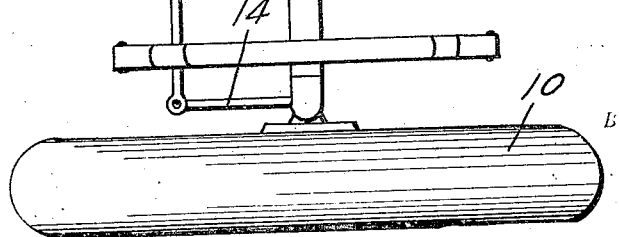
INVENTOR.
William D. Werts
BY Herman Miller
ATTORNEY.

Patented May 6, 1924.

UNITED STATES PATENT OFFICE.

1,493,009

WILLIAM D. WERTS, OF LOS ANGELES, CALIFORNIA.

VEHICLE TRAILER-STEERING DEVICE.

Application filed September 15, 1921. Serial No. 500,859.

*To all whom it may concern:*

Be it known that I, WILLIAM D. WERTS, a citizen of the United States, residing at Los Angeles, in the county of Los Angeles and State of California, have invented new and useful Improvements in Vehicle Trailer-Steering Devices, of which the following is a specification.

This invention relates to a vehicle steering device and has for its object to provide a simple, durable and novel means by which a trailer may be properly steered from a towing vehicle.

It is a further object to provide means in the steering mechanism that will allow the steering wheels to pass over obstructions, causing flexure of the body springs, without deflecting the wheels out of their path. Such a construction comprises substantially a draw bar pivotally supported to the body of the trailer, an arm projecting rearwardly from the draw bar and having slidable engagement with a steering arm, the same being pivotally connected for vertical movement to a steering lever intermediate the two steering levers carried by the steering knuckles all of these levers being pivotally connected to a tie rod.

Other objects and advantages will be seen and the invention readily understood from the following description of the accompanying drawings in which:

Fig. 3 is a transverse section on line 3—3 of Fig. 2.

Fig. 4 is a bottom plan view of my draft arm connected to the body taken on line 4—4 of Fig. 2.

Fig. 5 is a longitudinal section on line 5—5 of Fig. 4.

Fig. 6 is a plan view taken on line 6—6 of Fig. 2.

Fig. 7 is a transverse section taken on line 7—7 of Fig. 6.

Fig. 8 is a section taken on line 8—8 of Fig. 6.

Figure 1:
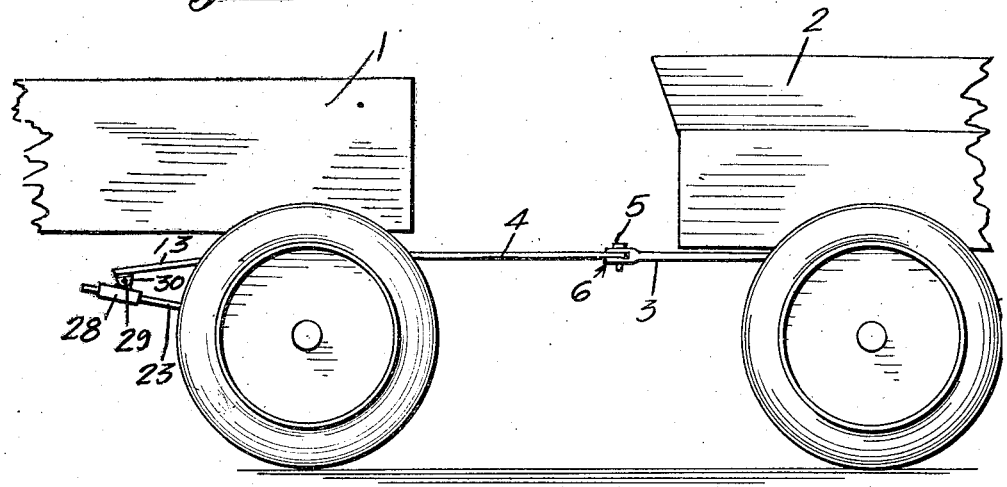
Fig. 1 is a fragmentary side elevation showing a towing vehicle and trailing vehicle embodying my improved steering device.
Figure 2:
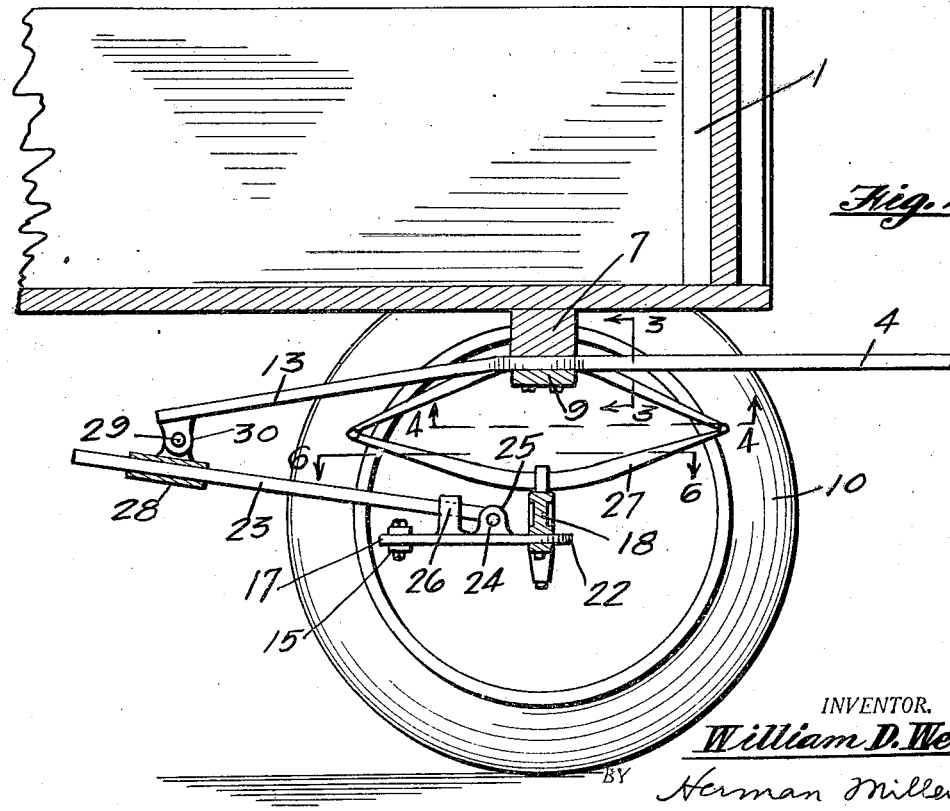
Fig. 2 is an enlarged longitudinal central section of the trailing vehicle showing my steering device partly in elevation.

My improved steering device is shown incorporated in a trailing vehicle 1 drawn by any suitable means here shown as a towing vehicle 2 having a fastening link 3 to which is pivotally connected the draw bar 4 of the trailing vehicle. The connection between the draw bar and connecting link could be of any suitable construction, but shown in the drawing as a bolt 5 passed through a tongue and yoke construction 6. The draw bar is pivotally connected to a transverse body support 7 by means of a bearing disk 8 rigidly fixed to the support as by a plate 9 and positioned intermediate the steering wheels 10 of the trailer.

The plate 9 in turn is rigidly connected to the support 7 and spaced therefrom by spacers 11 through which bolts may be passed to support the plate 9 to the support 7. The draw bar has an enlarged portion 12 with a central bore adapted to rotatably fit upon the central portion 8 and extending rearwardly from the enlarged portion is an arm 13 shown as slightly bent downward.

The wheels 10 are shown supported upon any usual type of steering knuckle having steering levers 14 to which the usual tie rod 15 is pivotally mounted. In my construction as shown the rods 15 are pivotally supported at their center as at 16 to an intermediate steering lever 17 said lever being connected to the front axle 18 as by a construction similar to that of the draft arm and comprises substantially a central bearing disk 19 and a plate 20 spaced from the axle and rigidly held thereto as by bolts 21. The intermediate steering lever has an enlarged portion 22 with a central bore adapted to rotatably fit upon the disk 19 and it will thus be seen that when the wheels turn that the lever 17 will pivot around the disk 19.

The connection between the intermediate lever and the arm 13 extending rearwardly from the draft arm comprises a steering arm 23 pivotally supported for vertical movement to the intermediate lever as by a rod 24 passed through upwardly extending bearing lugs 25, mounted near the enlarged portion 22. To relieve the bolt 24 of unnecessary strain, upwardly extending supporting guide lugs 26 are carried by the intermediate lever and spaced rearwardly from the lugs 25. A slot is thus formed between the two lugs 26 in which the steering arm 23 is slidably received so that as the springs 27 between the axle and the body of the vehicle are flexed, the steering arm will continuously have a two point supporting connection with the intermediate lever.

Means are provided connecting the arm 13 and the steering arm 23 so that when the wheel rolls over bumps and causes the springs to be flexed that there will be no undue stress placed upon the tie rods or other connecting links and such a means comprises a member 28 slidably mounted upon the arm 23 and having a pivotal connection as at 29 to the end of the arm 13 through a depending bearing lug 30.

It is thus seen that in the operation when the draft arm 4 is turned that the steering arm will also be turned which in turn turns the wheels through the intermediate link and the tie rods.

Various changes may be made in the details of construction by those skilled in the art without departing from the spirit of my invention as set forth in the appended claims.

What is claimed is:

1. In combination, a vehicle including a body, a front axle, and tie rods, a steering lever pivotally sustained on the axle and connected to said tie rods, a draw bar pivotally sustained on the body and having an arm extending rearwardly of the axle, a steering arm pivotally connected to the lever and extending rearwardly from the same, and a slidable and pivotal connection between said arm and said steering arm.

2. A steering device for vehicles having an axle with wheels pivotally mounted thereon and means connecting said wheels through an intermediate steering lever, said device comprising a draft arm, a steering arm connected to said draft arm and said steering lever, and means whereby relative movement between said axle and body of said vehicle does not actuate said steering wheels.

3. A steering device for vehicles having an axle with wheels pivotally mounted thereon and means connecting said wheels through an intermediate steering lever, said device comprising a draft arm pivotally connected to said vehicle, an arm extending rearwardly from said draft arm, a slidable member pivotally supported by said arm, a steering arm projecting forwardly from and slidably received in said member, said steering arm pivotally connected to said steering lever, lugs projecting from said lever and slidably engaging said steering arm.

4. In combination, a vehicle including a body, a front axle, and tie rods, a steering lever pivotally sustained on the axle and connected to said tie rods, a draw bar pivotally sustained on the body and having an arm extending rearwardly of the axle, a steering arm pivotally connected to the lever and extending rearwardly from the same, a slidable and pivotal connection between said arm and said steering arm, and means on the steering lever for holding the steering arm against lateral movement and permitting vertical movement thereof.

5. In combination, a body support, an axle, a draw bar having an enlarged portion, a bearing member secured to the body support and rotatably receiving said enlarged portion, a steering lever having an enlargement, a bearing member secured to the axle and rotatably receiving the enlargement, an arm formed on the draw bar and extending rearwardly of the body support and axle, a steering arm pivotally connected to the steering lever, and a sliding connection between said arm and steering arm.

In testimony whereof I have signed my name to this specification.

WILLIAM D. WERTS.